Feb. 14, 1950
S. V. HART
2,497,218
SATURABLE REACTOR SYSTEM
Filed March 25, 1948
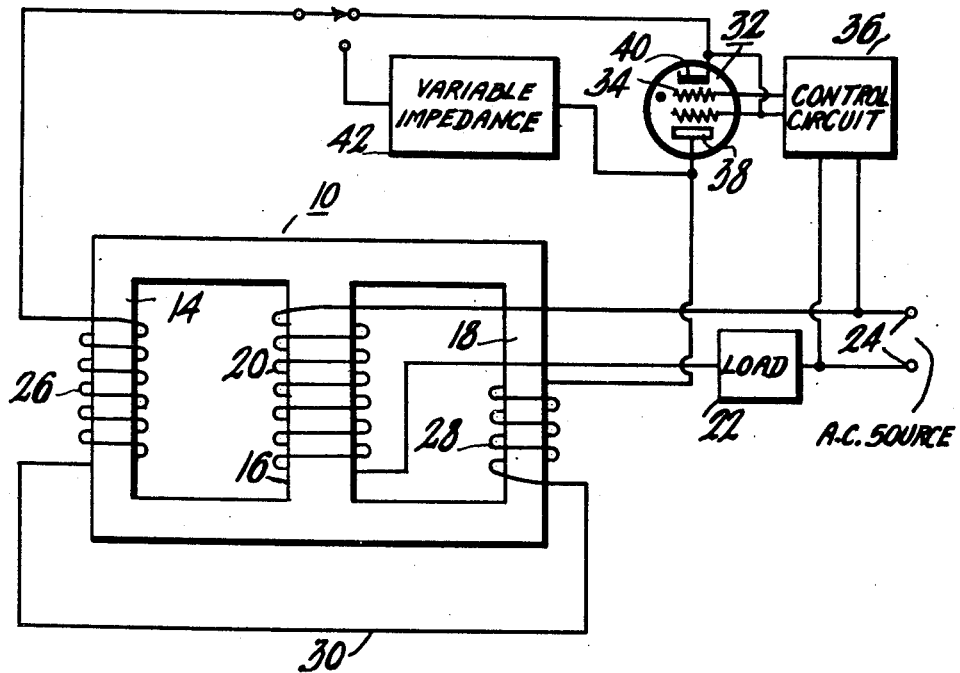
INVENTOR
Stephen V. Hart
BY
ATTORNEY Patented Feb. 14, 1950

2,497,218

UNITED STATES PATENT OFFICE 2,497,218

SATURABLE REACTOR SYSTEM

Stephen V. Hart, New York, N. Y., assignor to Radio Corporation of America, a corporation of Delaware Application March 25, 1948, Serial No. 17,057

13 Claims. (Cl. 323—86)

This invention relates to saturable core reactors.

Arrangements are known in which an external direct current voltage supply source is applied to one of the windings of a saturable core reactor to saturate the core to a desired degree and thereby obtain regulation of the current passage through the device. However, such arrangements require a separate source of voltage supply or separate rectifying circuits which are undesirable. It is desirable in alternating current regulating devices to utilize an electronic control of the core saturating current. Such control sometimes requires extensive and bulky equipment because of the high current which must pass through the control tube, if one is used, requiring the use of large and expensive tubes.

It is an object of the present invention to provide a saturable core reactor for regulation of the alternating current through, for example, a heating or lighting load requiring a large amount of current.

It is a further object of the invention to provide a saturable core reactor, the saturating current and regulating effect of which may be controlled simply and economically with a low current capacity tube.

In accordance with the invention I provide a core structure having three magnetically parallel branches upon one of which is a primary winding. The load, the alternating current voltage source, and this primary winding are serially connected. Each of the other two legs of the core structure has secondary winding thereon having unequal numbers of turns. These secondary windings and an impedance are serially connected in circuit, that is to form a complete current path, with the secondary windings in bucking relationship, that is, with the voltage induced in the secondaries by the load current through the primary winding opposing each other. Further, in a preferred form of the invention, the impedance is a rectifying device and the rectifying device is a gas tube having a control element, for example a thyratron, which may be controlled in conventional manner.

Referring now to the sole figure of the drawing, a core structure 10 has three magnetically parallel branches 14, 16, 18. A primary winding 20 around the branch 16, a load 22, and an alternating current voltage source 24 are serially connected. Windings 26 and 28 around the branches 14 and 18, respectively, are directly connected at one end of the windings by a lead 30 and are connected at the other ends thereof through thyratron 32. The connections of the windings 26, 28 are such that the voltages induced therein by current in the primary winding 20 are in opposed relationship. One of the grids 34 of tube 32 may be connected to a circuit 36 which may be connected to the source 24, the control circuit serving to determine that portion of a half cycle during which tube 32 is fixed to become conductive. Control circuit 36 may be of a very simple type, and in one of its forms may comprise merely a phase shifting circuit so that a positive voltage is applied to one of the grids 34 at a desired point in the half cycle during which the plate 38 of tube 32 becomes positive with respect to the cathode 40 of tube 32, thereby initiating conduction in tube 32 which may continue to conduct for the remainder of said half cycle.

In operation, since the windings 26, 28 are connected in bucking relationship, a smaller maximum current passes therethrough than the current which would pass through one of the windings 26, 28 if it were used alone. As explanation of the action of the coil assembly, it is observed that the control current flows through windings 26 and 28 in such a direction that the saturating effect is additive whereas the induced voltages subtract. Thus, the advantage of creating the effect of a large number of ampere-turns is achieved, without the disadvantage of a high secondary terminal voltage. This is particularly important when a thyratron is used in the control circuit as gas-filled tubes are vulnerable to high anode voltage. I prefer to have the secondary legs smaller in cross-sectional area than the primary legs, as indicated on the drawing by the relative dimensions thereof.

The bucking connection of windings 26, 28 may be made by short-circuiting the tube 32, or by replacing the tube by a variable linear impedance 42, which includes, of course, zero impedance. The tube itself may be considered as a non-linear impedance varied by the control circuit. For example, a linear impedance, such as a variable resistance, may be connected in place of the tube. With a resistance, the saturation reaches its peak substantially in phase with the peaks of alternating current in the primary circuit on each alternation to give a regulatory effect as the primary current increases. The regulatory effect may be controlled by varying the resistance. With other impedances, the regulatory effect may be varied with proper variation thereof, which may include phasing the saturating current with the primary current.

What is claimed is:

1. Current regulating apparatus for regulating the alternating current through a load from a source of alternating current voltage, comprising a magnetic core structure having three magnetically parallel branches, a primary winding on one of said branches, said load, said primary winding, and said source being serially connected, secondary windings on the other of said branches, said secondary windings having unequal turns, and a rectifying device, said secondary windings and said rectifying device being serially connected in circuit with said windings in bucking relationship.

2. The current regulating device claimed in claim 1, said rectifying device comprising a gas tube.

3. The current regulating device claimed in claim 1, said rectifying device comprising a gas tube having a control element.

4. The device claimed in claim 1, said branches on which said secondary windings are wound each having a cross-sectional area less than said branch on which said primary winding is wound.

5. Current regulating apparatus for regulating the alternating current through a load from a source of alternating current voltage, comprising a magnetic core structure having three magnetically parallel branches, a primary winding on one of said branches, said load, said source and said primary winding being serially connected, secondary windings on each of the other of said branches and having unequal turns, a rectifying device, said secondary windings and said rectifying device being serially connected in circuit with said windings in bucking relationship, and a control circuit connected to control the periods of rectification of said device.

6. The current regulating apparatus claimed in claim 5, said rectifying device comprising an electronic tube.

7. Current regulating apparatus for regulating the current through a load from a source of alternating current voltage, comprising a magnetic core structure having three magnetically parallel branches, a primary winding on one of said branches, said load, said source, and said primary winding being serially connected, secondary windings on each of the other of said branches and having unequal turns, an impedance, and said secondary windings and said impedance being serially connected in circuit with said windings in bucking relationship.

8. The apparatus claimed in claim 7, said impedance being a linear impedance.

9. The apparatus claimed in claim 7, said impedance being a resistance.

10. The apparatus claimed in claim 7, said impedance being a short-circuit.

11. Current regulating apparatus for regulating the current through a load from a source of alternating current voltage, comprising a magnetic core structure having three magnetically parallel branches, a primary winding on one of said branches, said load, said source and said primary winding being serially connected, secondary windings on each of the other of said branches, the turns of said secondary windings being arranged to have unequal induced voltages therein for a given change of flux in said primary magnetic core branch, and an impedance, said secondary windings and said impedance being serially connected in circuit with said windings in bucking relationship.

12. The apparatus claimed in claim 11, said impedance being a rectifying device.

13. The apparatus claimed in claim 12, said rectifying device being a gas tube.

STEPHEN V. HART.

REFERENCES CITED

The following references are of record in the file of this patent:

UNITED STATES PATENTS

| Number | Name | Date |
|---|---|---|
| 1,652,923 | Alexanderson | Dec. 13, 1927 |
| 1,981,921 | Logan | Nov. 27, 1934 |